United States Patent [19]

Archer et al.

[11] Patent Number: 5,255,293
[45] Date of Patent: Oct. 19, 1993

[54] PHASE LOCKED LOOP ARRANGEMENT

[75] Inventors: David L. Archer, Kirrawee; Timothy C. Rayner, Kensington, both of Australia

[73] Assignee: Alcatel N.V.

[21] Appl. No.: 664,654

[22] Filed: Mar. 5, 1991

[30] Foreign Application Priority Data

Mar. 14, 1990 [AU] Australia ............................. PJ9104

[51] Int. Cl.⁵ ...................... H04L 7/027; H04L 7/02
[52] U.S. Cl. .................................... 375/118; 375/118; 375/121
[58] Field of Search ............... 375/110, 112, 114, 118, 375/121, 111; 370/102, 105.3, 105.4, 105.5

[56] References Cited

U.S. PATENT DOCUMENTS

| 4,347,620 | 8/1982 | Black et al. | 375/112 |
| 4,791,652 | 12/1988 | McEachern et al. | 375/118 X |
| 4,882,754 | 11/1989 | Weaver et al. | 375/122 X |

Primary Examiner—Curtis Kuntz
Assistant Examiner—Tesfaldet Bocure
Attorney, Agent, or Firm—Ware, Fressola, Van Der Sluys & Adolphson

[57] ABSTRACT

The invention can be used to extract information in a Synchronous Digital Hierarchy (SDH) transmission system and relates to the extraction of information from a PCM data stream. It is desirable to provide a Dual Filtering Method for a System having dual data rate justification in a simple manner using minimum components. To obtain a relatively simple circuitry a single controlled oscillator source is used to time the data output stream.

24 Claims, 7 Drawing Sheets

I INFORMATION BIT
O OVERHEAD BIT
C JUSTIFICATION CONTROL BIT
S JUSTIFICATION OPPORTUNITY BIT
R FIXED STUFF BIT (S)

PHASE LOCKED LOOP ARRANGEMENT

BACKGROUND OF THE INVENTION

1. Field of the Invention

This invention relates to the extraction of information from a PCM data stream. In a particular application the invention can be used to extract information in a Synchronous Digital Hierarchy (SDH) transmission system.

2. Description of the Prior Art

The extraction of information from such a system can be equated to the recovery of clock signals from a data stream composed of signals from a plurality of clock sources.

In an SDH system the data stream may include e.g. frame clocks, byte clocks, and bit clocks each conveying different manifestations of information.

Within the known SDH range of equipment described in CCITT recommendations G707, 708 and 709 there is provision for possible clock frequency differences caused by the plesiochronous nature of the digital telephone network. These differences are processed using a so-called floating mode of operation within the hierarchy, as described in the aforementioned CCITT (International Consultive Committee for Telephone and Telegraph) recommendation G709. With the floating mode of operation two methods of data rate justification are used for clock correction, viz. Byte mode justification for those clock differences apparent within a network of SDH equipment; and bit mode justification for those clock differences apparent at tributary interface points where external networks connect to the SDH equipment network. The resultant sum of these justification processes must be processed at the tributary output ports and this is usually done using one or more elastic stores (FIFO) together with phase locked read clocks to prevent loss of data while attenuating framing and justification jitter present at the tributary output ports. The store can be implemented also by other suitable known stores such as a RAM. In one embodiment the invention may be used to handle packet data where different packets may arrive out of order due to different transmission paths. In such a case the store could be implemented by the use of a RAM from which the packet data could be read out in the correct sequence.

Designs presently exist for phase locked loops which provide filtering means similar to that required by SDH equipment (see British Telecom's submission T1X1 6/89 entitled "SONET Desynchronisers") but these designs are either excessively complex or lack flexibility in processing the dual justification referred to above.

Each of the two aforementioned justification methods have different requirements; the first justification method, being byte mode in nature, but restricted within the SDH network where clock frequency differences will be small, will have characteristics of low frequency large amplitude (8 bit) phase hits which require considerable smoothing to maintain performance required by equipment having interfaces designed in accordance with CCITT G703 recommendations and jitter tolerance specifications in accordance with limits set in the CCITT G823 recommendations. The second justification method, being bit mode in nature, and having characteristics of the network external to the SDH network, requires a fast response time enabling quick settling times from transient error and changeover related conditions occurring outside the SDH equipment.

The aforementioned British Telecom submission proposes dual elastic stores and phase locked oscillators to provide these dual justification processing methods, but the complexity of the circuitry required to implement the arrangement proposed in the British Telecom submission is obvious.

It will be understood that compromise arrangements can be designed which have simpler circuitry but performance will be sacrificed. For example a single phase locked loop could be utilized but it would require filter characteristics to meet the most severe jitter source equivalent to the Byte Mode justification referred to above. Speed of response and settling time imposed on the smoothing of the bit mode justification would be sacrificed.

SUMMARY OF THE INVENTION

It is desirable to provide a dual filtering method for a system incorporating dual data rate justification in a relatively simple manner. Broadly, the inventive method comprises storing two or more bytes of the input data as it is received in buffer store means, calculating the time average over a first period of time at which the input data is received, and generating an output clock to feed the data out of the store at an output pulse rate which over a second period of time has the same time average as the input data bit rate, wherein the input data rate is subject to two or more sources of fluctuation, and wherein the output pulse rate can be selectively adjusted in response to the source of the fluctuation.

In particular the method can be used to extract data at a rate approximating the input rate after the input data has been multiplexed with other data and transmitted at a higher data rate.

This specification describes a method of providing a controlled response from each of a plurality of clock sources to a single controlled oscillator means using independently sensed information signals from each clock source, each clock source contributing to a total data process forming a data stream whose rate requires filtering by the controlled oscillator means, said method comprising the steps of:

1. Monitoring each said clock source for transient conditions.
2. Generating a response characteristic for each monitored clock source.
3. Summing the results of the characteristics so generated to obtain a total modifying function.
4. Obtaining a total phase difference signal between the data stream to be filtered and the controlled oscillator means' output.
5. Adding the total modifying function to the total phase difference to produce a modified phase function.
6. Processing the modified phase function to produce a control signal for application to said controlled oscillator means.

Preferably the plurality of clock sources comprise a basic clock means containing framing gaps, and other clocks generated by bit and/or byte justification information data.

Preferably, the data stream is recovered by combining the basic clock means and the justification clocks in accordance with relevant information bits exiting from a preceding transmission source. The justification clocks indicate when optional bits or bytes should be omitted or included, depending on whether the bit or byte contains data or justification.

Preferably, the total phase difference signal is obtained by subtracting the read address from the write address of an elastic store means used to buffer the data stream as it is processed by the sum of the basic clock means and the justification clocks forming the write clock, and the controlled oscillator means output forming the read clock. This is an indication of the different rates at which data is written into and read from the store. The read clock can be adjusted accordingly.

A phase locked loop oscillator may be implemented from the method of the invention which exhibits bandpass filtering characteristics differing on the basis of at least two independent controlling sources. The characteristics may be cascaded or paralleled to produce a variety of filtering combinations.

The specification also discloses an arrangement for adjusting the local data rate to accommodate the data rate of an incoming data stream which includes byte justification information and bit justification information, the arrangement comprising:

first adder means for adding the byte justification information to the incoming data byte clock information, the output of the first adder means being applied to byte elastic store means as the byte input clock, the data from the incoming data stream being fed into the elastic store means under the control of the byte input clock, the byte elastic store including a store fill status output indicating the level of the contents of the elastic store, the byte justification information being applied to a first coefficient generator which produces an output corresponding to the rate of byte justification insertion in relation to the data byte rate, combining means to combine the output of the first coefficient generator and the store full status output, the output of the combining means being applied to a second coefficient generator which controls the frequency of a local clock oscillator to bring the frequency of the local clock oscillator closer to synchronism with the bit clock rate of the incoming data, the output of the local clock oscillator is combined with the bit justification and controls the reading of data from the elastic store into a byte/bit converter, the data being read from the byte/bit converter under the control of the output of the local clock oscillator.

Also disclosed is a method for adjusting the local clock data rate to accommodate the data rate of an incoming data stream which includes byte justification information and bit justification information, the method comprising:

adding the byte justification information to the incoming data byte clock information to produce a first control clock signal, storing the incoming data in an elastic store under the control of the first control clock signal, deriving a store fill status output from the level of the contents of the elastic store, generating a first coefficient representative of the rate of byte justification in relation to the data byte rate, combining the first coefficient with the store fill status output to provide an input to a local clock control circuit, and controlling the frequency of the local clock thereby, combining the output of the local clock with the bit justification information to produce a second control clock signal, transferring the contents of the elastic store to a byte/bit converter under the control of the second control clock signal, and controlling the output of the byte/bit converter to output the data at the frequency of the local clock.

DESCRIPTION OF THE DRAWINGS

In order that the invention may be readily understood an embodiment thereof will now be described in relation to the drawings, in which.

DETAILED DESCRIPTION OF THE PREFERRED EMBODIMENT

To place the invention in context a brief discussion of a typical transmission system will be given by way of example.

Figure 5:
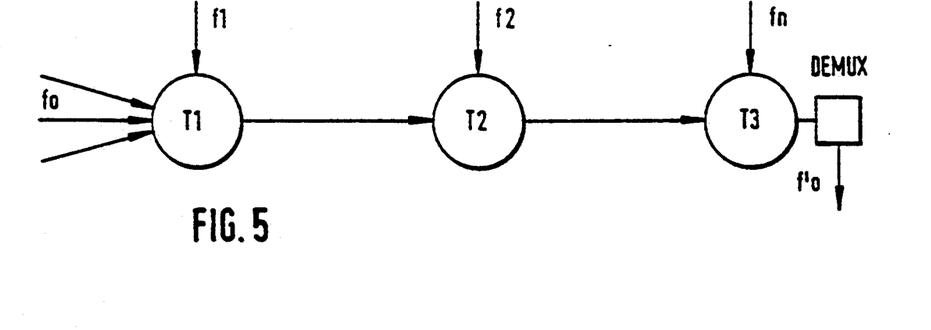
FIG. 5 shows a transmission system in which the invention may be used.

FIG. 5 shows a telecommunications system in which the invention may be applied. In FIG. 5 a plurality of tributary data streams with a bit rate of fo are shown, are multiplexed and enter into the transmission system of T1. The data with frequency fo must be re-timed and formed into bytes at the transmission rate from T1, i.e. f1. This may require some "bit stuffing" at T1 for compatability. This will be discussed further in relation to the data multiframe and higher level data structures.

The data may pass through a series of data terminals (T2 . . . Tn) each of which may have variations in its operating frequency. At each terminal these frequency variations are corrected by "byte stuffing" as discussed below.

When the original message sent at fo reaches the terminal Tn to which the station to which the message is addressed is connected, it is necessary to eliminate the bit and byte-stuffing to reconstruct the message at fo which is extracted by demultiplexing.

Figure 6:
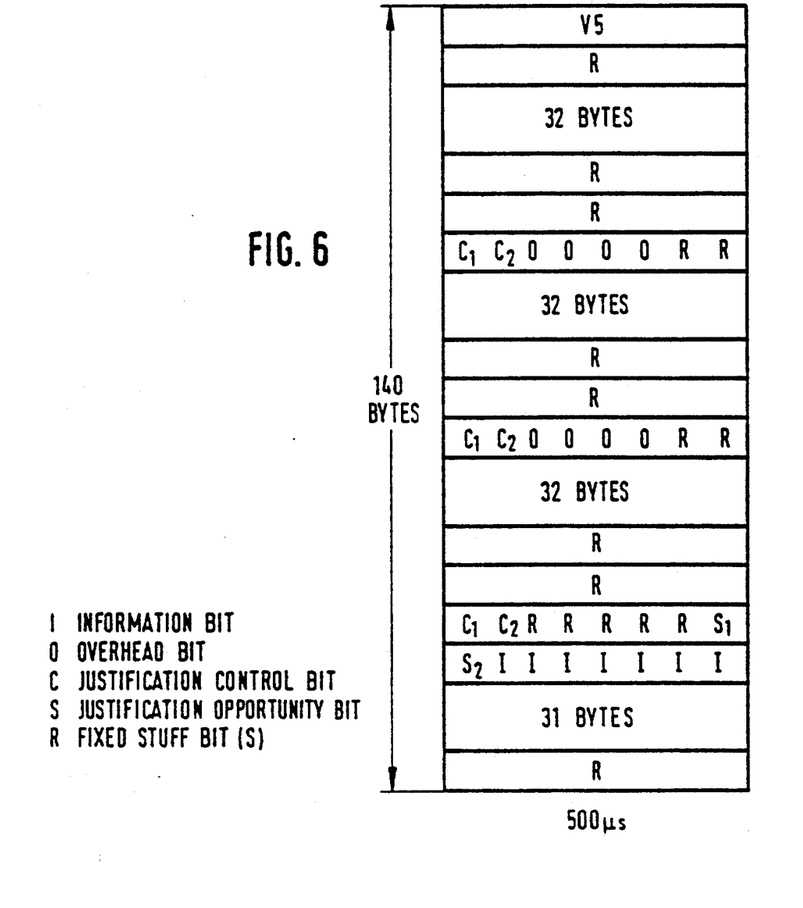
FIG. 6 illustrates bit justification.

A typical multiframe structure for such a system is shown in FIG. 6 and a higher order data structure built up from the contents of such multiframes is shown in FIG. 7.

An example of how bit justification is achieved under CCITT G.709 is discussed with reference to FIG. 6.

This figure shows a block of 140 bytes which include three frames each with a byte including bits C1 and C2. The last frame also includes bits S1 and S2 and these bits may be used to carry data or justification bits. The three bits C1 are used on a majority decision basis, to indicate whether S1 is data or justification, and the C2 bits do likewise for S2. Majority decision is used to reduce effects of one C1 or C2 pulse being corrupted. Thus at the receiving end bits C1 and C2 are used to indicate whether S1 and S2 are data or justification bits.

In FIG. 6, 1 represents a normal information bit, 0 is a reserved bit, R is a fixed stuff bit, C is a justification control bit, and S is a justification opportunity bit.

Byte justification is discussed with reference to FIG. 7, which shows an array of 4 frames each consisting of 270×9 bytes.

Figure 7A:
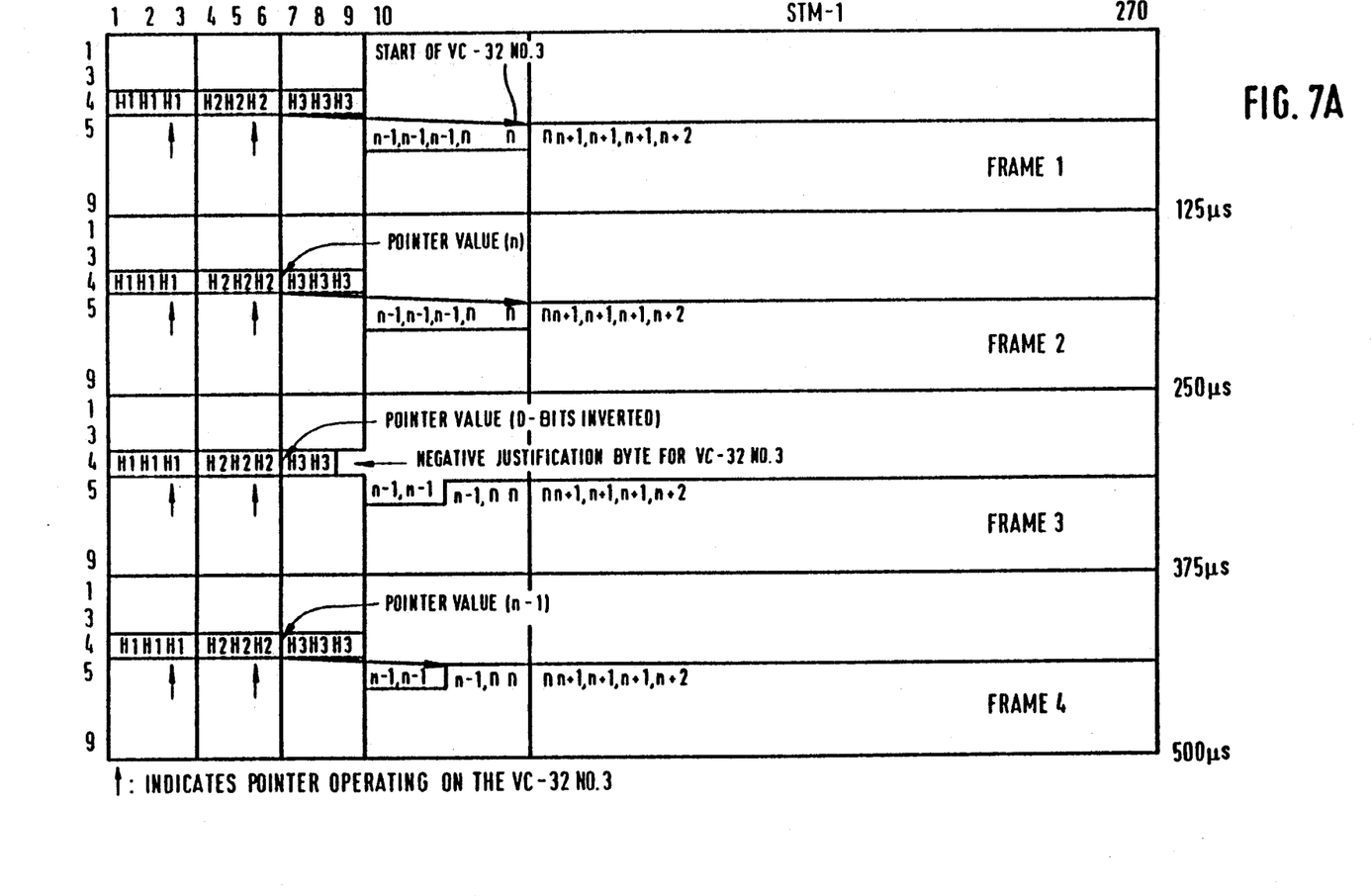
FIG. 7 illustrates byte justification.
Figure 7B:
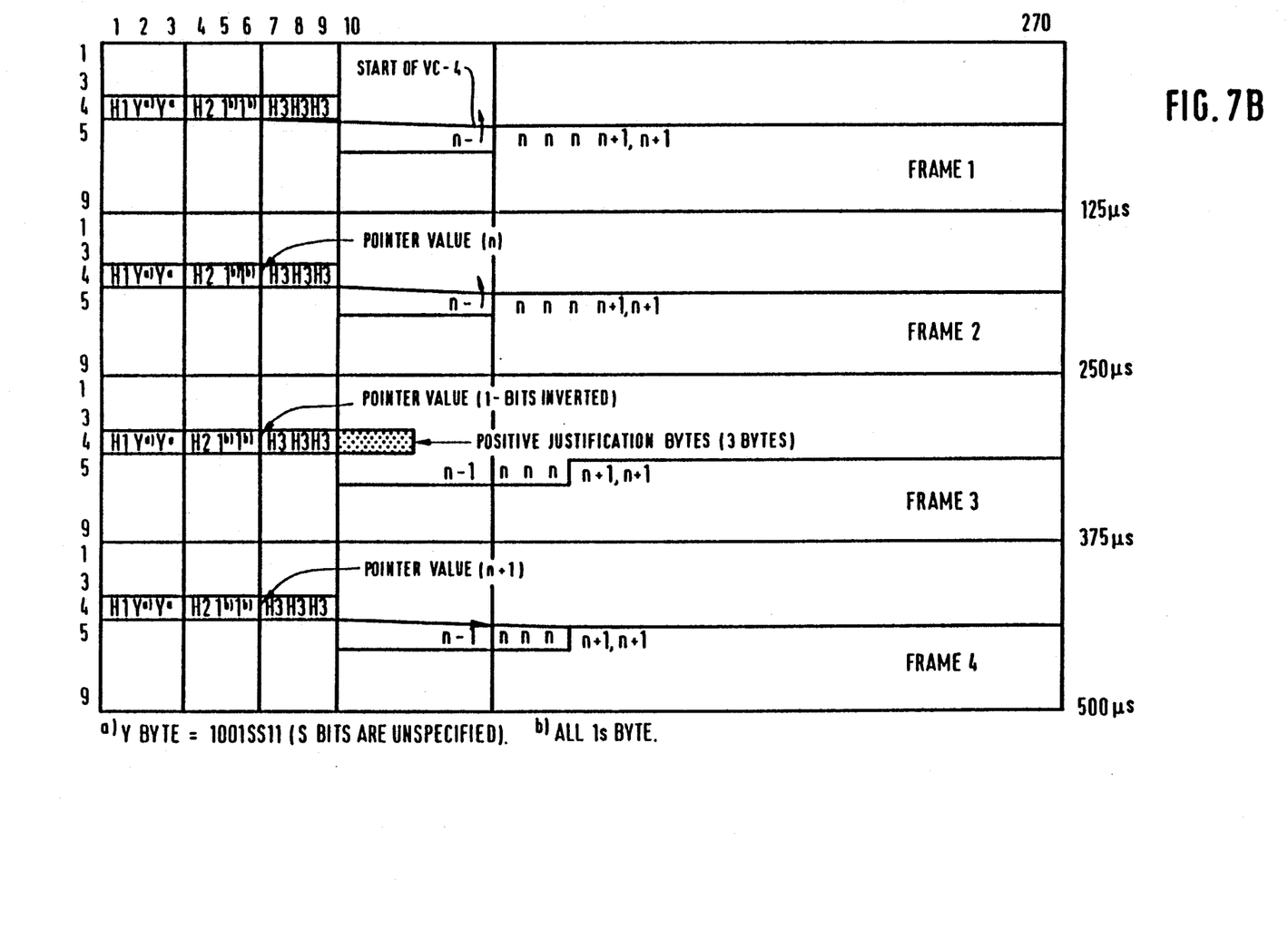

Within the first 9 columns of each frame row 4 is made up of a selection of bytes labelled H1, H2, H3, Y, and 1. An SDH system is designed to carry various types of data structures and the information carried in the byte justification location bytes H1, H2, H3 is adjusted according to the type of data being transmitted. The bytes H1 and H2 carry information identifying the justification bytes, or as in the embodiment shown, they indicate the end of the justification bytes. The H3 bytes are available for negative justification opportunities (FIG. 7A), and these are followed by a similar number of bytes available for positive justification opportunities (FIG. 7B).

Where there is a mis-match between the byte transmission rates of different segments of a transmission path, the justification bytes are used to correct the mismatch. To permit two-way adjustment, each group of four frames contains a number of justification opportunities which may be increased or reduced as required. This is illustrated by negative and positive justification as shown in FIGS. 7A and 7B.

In the SONET system a data channel may be a 2 Mbit/sec data stream. SONET which has a transmission rate of 155 Mbit/sec can carry 63 such channels together with "housekeeping" information. At the receiving end the data may be de-multiplexed to give an output containing the information from the 2 Mbit/sec input. However the form of this output is intermittent bursts of 155 Mbit/sec, e.g. 8 bit bytes separated by varying time gaps. The variation in the time gaps is caused by byte justification, i.e. the insertion or removal of dummy bytes to match the input data to the SONET transmission rate. In addition, byte lengths may vary (bit justification). Justification bits may occur in SONET every 4 bytes while up to 3 justification bytes may occur every 4 frames of 2430 bytes/frame.

The output clocking must be able to compensate for both types of justification but clearly there is much more time available to deal with the large corrections (8 bits/byte) required for byte justification, compared with the time available to correct for bit justification. The object of adjusting the output clock is to produce an output data rate in which both transitions can be achieved smoothly.

The smoother the changes in the output clock rate, the easier it is for the receiving equipment to track the changes.

As discussed above the basic SONET system provides two sources of clock adjustment, bit justification and byte justification. There are proposals for systems which may have a plurality, e.g. 5, different sources of clock adjustment and the invention can be applied also to such systems by providing a suitable number of variations in the output clock algorithm.

Figure 1:
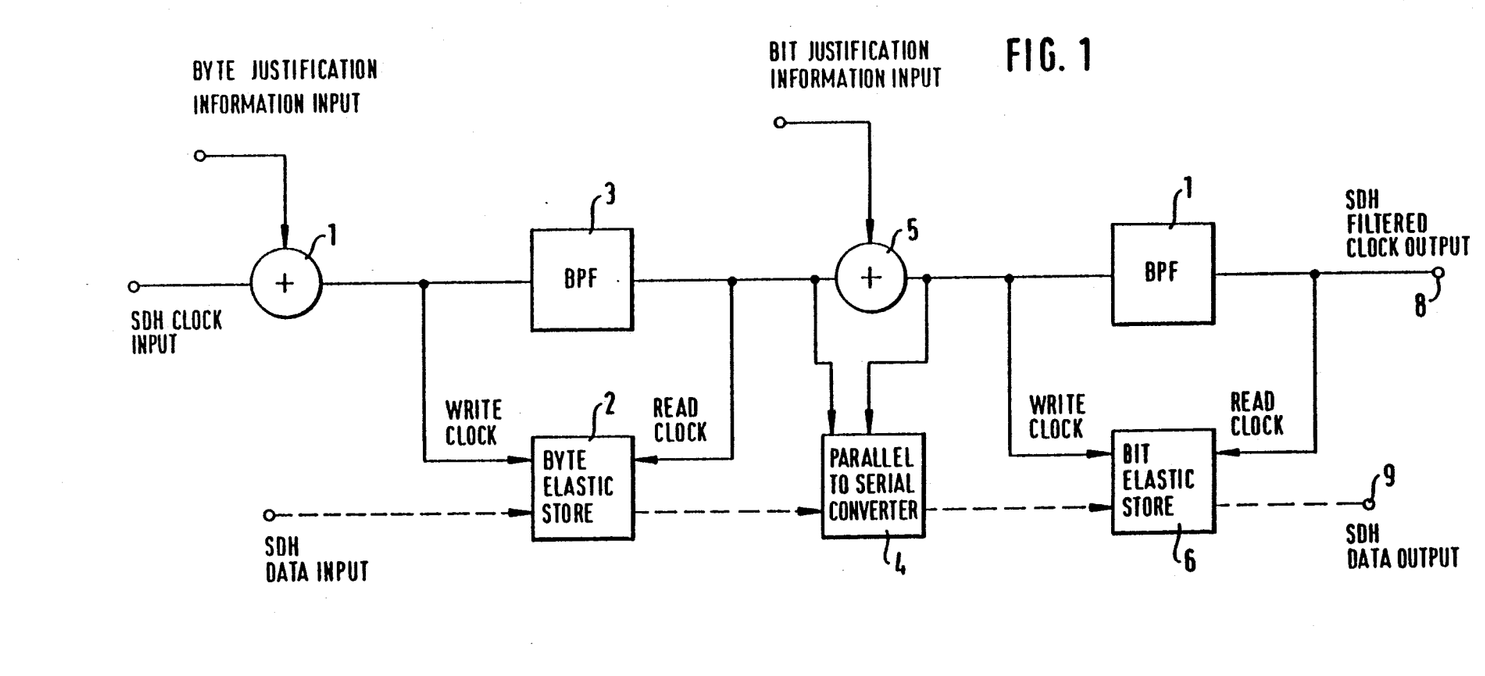
FIG. 1 shows a clock filtering arrangement required for SDH equipment, in the form of a bandpass filter filtering an incoming reference clock frequency so that noise and sidebands outside the filter's passband are substantially attenuated and a cleaner clock signal is provided by the filtering arrangement.

Referring to FIG. 1, a raw SDH clock signal, which may contain framing gaps and other distortions, has added to it byte justification information in a summing device 1. This modified clock signal is then used to load data into a byte elastic store 2 as well as being applied to a bandpass filtering device 3. The clock at the output of bandpass filtering device 3 has been rendered significantly cleaner by the filtering device and is utilised as a read clock to unload data from elastic store 2 from where it is forwarded to a parallel to serial converter 4 for conversion from bytes of data to a serial bit stream of data. At this point bit justification information is applied to both clock and data in summing device 5 and converter 4 respectively. The resultant clock signal from summing device 5 is used to load data from converter 4 into a second elastic store 6. The clock from summing device 5 is also applied to a second bandpass filtering device 7 so that a filtered clock is available at output 8. This clock is also used to output data from the second elastic store 6 and present it at data output 9.

It should be noted that in practical application the bandwidth of the second bandpass filtering device 7 is probably ten times that of the bandwidth of the first bandpass filtering device 3.

If the bandpass filtering devices shown in FIG. 1 were replaced by phase locked oscillators it would be seen that the bandpass characteristic is generated by the lowpass characteristic of the phase locked loop components converted with the oscillator frequency by a phase discrimination device associated with the phase locked oscillators, to form a bandpass filter centered on the oscillator frequency. This results in considerable simplification of the bandpass filter circuit especially when narrow bandwidths are required.

In the clock filtering arrangement described in relation to FIG. 1, all filtering is applied to the SDH clock signal and SDH data is smoothed by these clock signals in the associated FIFO type elastic stores 2, 4 and 6.

With respect to filter design generally, there are a number of methods known in the art by which a specified filtering function may be obtained. These methods include, for analogue designs, lattice or ladder configurations; and for digital designs, transversal or recursive in single or cascaded configurations, or combinations of both analogue and digital configurations. The present invention may use a combination of digital configurations as the preferred option.

Figure 2:
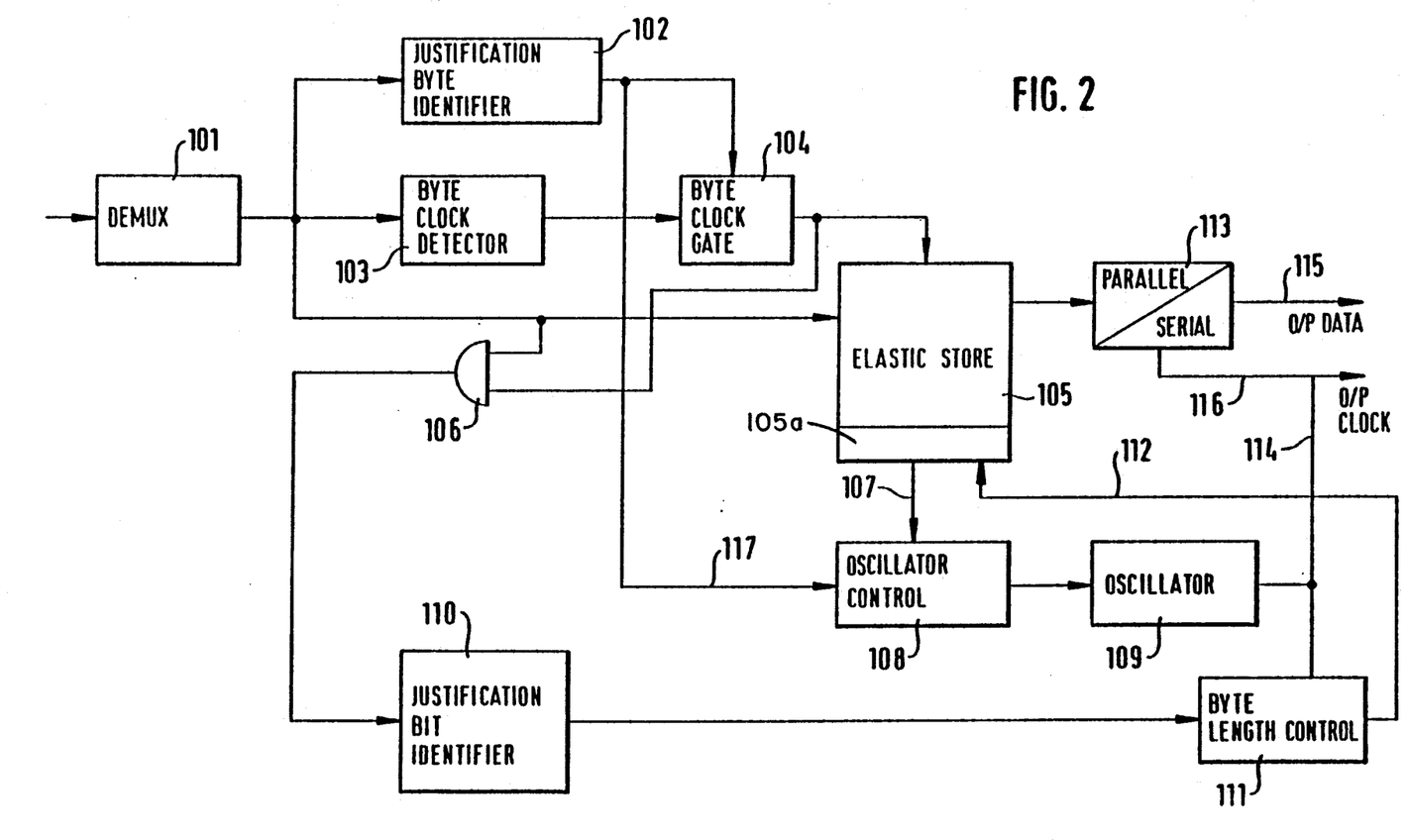
FIG. 2 shows a block diagram illustrating an implementation of the invention.

With reference to FIG. 2, data at the system transmission rate e.g. 155 Mbits/sec is demultiplexed in demultiplexer 101 into a plurality of channels, e.g. 63 channels. The data for each channel is then contained in irregularly spaced bursts of data at 155 Mbit/sec. The invention will be described in relation to one such channel.

Byte justification identification means 102 use the byte justification identification information contained in the data stream to identify the justification bytes. The output of this circuit is combined with the output of the byte clock detector 103 in byte clock gating means 104 to produce a write clock which is stripped of justification byte pulses. This write clock is used to control the input to buffer store means 105. This ensures that only bytes containing genuine information are admitted to the store 105.

Store 105 includes means to measure the contents of the store 105a and to provide a signal on line 107 indicating the level of the contents. In a preferred embodiment this may have an accuracy of ¼ bit.

A particular level of contents of store 105 is selected as the datum level, e.g. half full and the contents signal 107 is used to control the oscillator controller 108 to cause the frequency of the oscillator controller 108 to provide a control signal on line 108a and cause the frequency of the oscillator 109 to increase or decrease depending on the contents of the store 105.

Bit justification identification means 110 is fed with the input data bytes and identifies when a justification bit is received. This information is provided on line 110a and combined with the output of oscillator 109 in byte length control 111 to provide a read clock on line 112 for store 105 with a duration which can be varied between 7 and 9 pulses of output oscillator 109. Line 112 may have 2 wires to indicate byte length.

On receipt of a read clock pulse a byte of the appropriate length is read into parallel-to-serial converter 113 and is read out of the converter 113 under the control of oscillator 109 via line 114. Thus the smoothed data appears on line 115 and the output clock on line 116.

Oscillator control 108 can operate in two or more different modes and may be implemented by a coefficient generator. In the case where there are only two sources of clock adjustment, i.e. byte and bit justification, the output of, e.g., the justification byte identification means 102 is applied to control 108 via line 117 to identify when a justification byte adjustment is required, and cause control 108 to make the required adjustment to oscillator 109.

In the event of a justification bit being received this will be detected by the store contents measuring means 105 and indicated on line 107. The oscillator control 108 will recognise this as a justification bit because of the absence of a justification byte signal on line 117, and control 108 will cause an adjustment to oscillator 109 appropriate for a justification bit.

Figure 3:
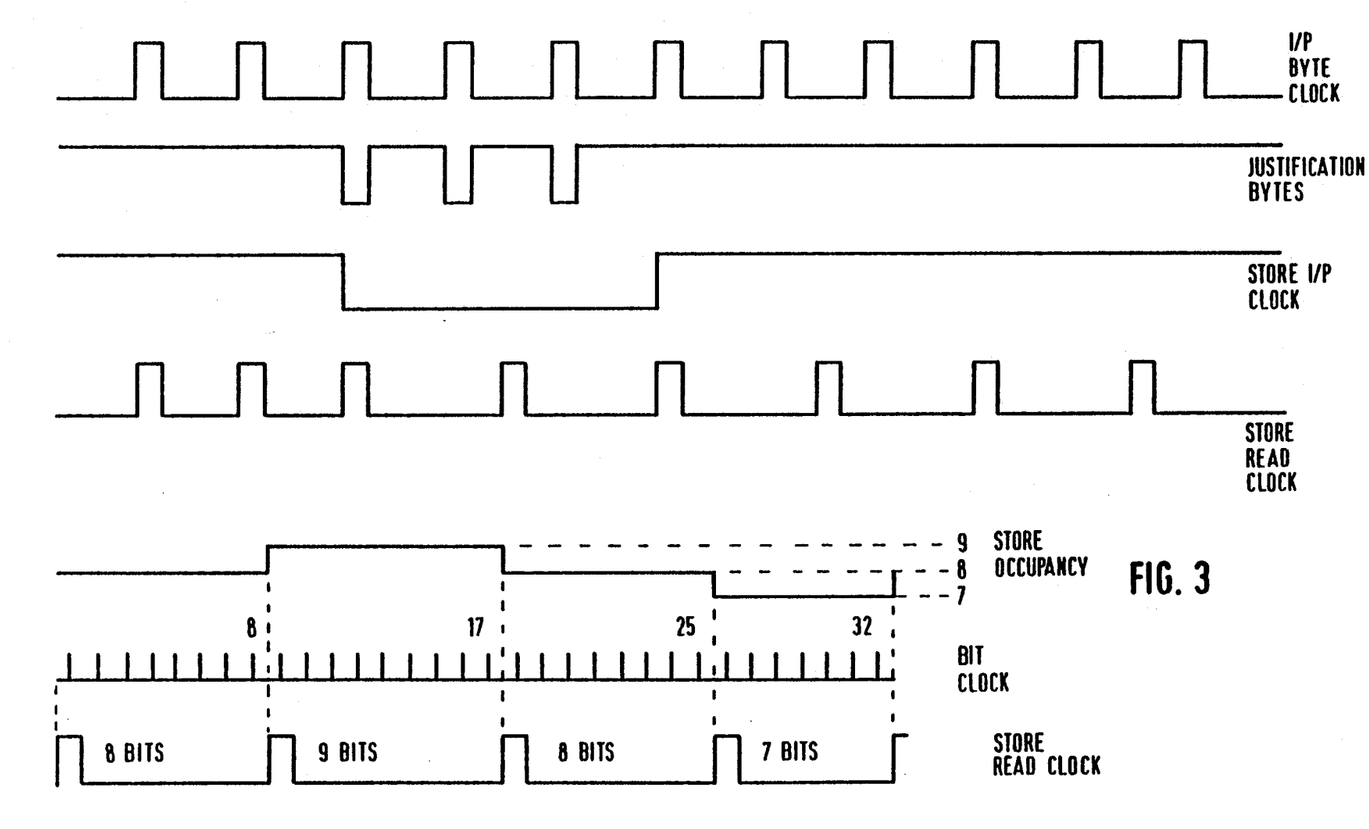
FIG. 3 is a simplified timing diagram illustrating various functions of the invention.

Thus the circuit is able to make different adjustments to the output clock from oscillator 109 depending on the cause of the need for adjustment. The system can be adapted to deal with a plurality of sources of clock adjustment which can be identified in the same way as bit and byte justification. The timing diagram of FIG. 3 is illustrative of the operation of the arrangement shown in FIG. 2. The byte clock detector (BCD) 103 detects the start of each byte and generates a pulse for each byte as shown in line (i). Justification bytes are identified in justification byte identifier (JBI) 102 (line ii) and gated with the output of BCD 103 to produce the write clock (line iii) for buffer 105, and this controls the data to be written into buffer 105, causing justification bytes to be excluded. The output from JBI 102 is applied via line 117 to oscillator controller 108 and notifies it that the consequent drop in contents of buffer 105 as notified to controller 108 is due to a justification byte and thus the controller 108 adjusts the oscillator 109 frequency accordingly. The bytes are thus fed out of buffer 105 at a slower rate and this is illustrated in line (iv) by showing e.g. 6 write pulses spread over the time which the data and justification bytes occupied in line (i). In reality this adjustment may be spread over several frames in an SDH system so only small incremental changes in the output of oscillator 109 are required. Line (v) illustrates that the incoming data bytes may have $8+/-1$ bits.

As shown in line (vi), if an incoming byte has 8 bits then there should be no change in the contents of buffer 105 to cause oscillator 109 to be adjusted. However, if an input byte has 9 bits this is detected at 107 and the controller 108 would interpret this as a justification bit in the absence of a signal on line 117 so that oscillator 109 is adjusted at the appropriate rate for bit justification as determined by the operating rules for the transmission system.

Figure 4:
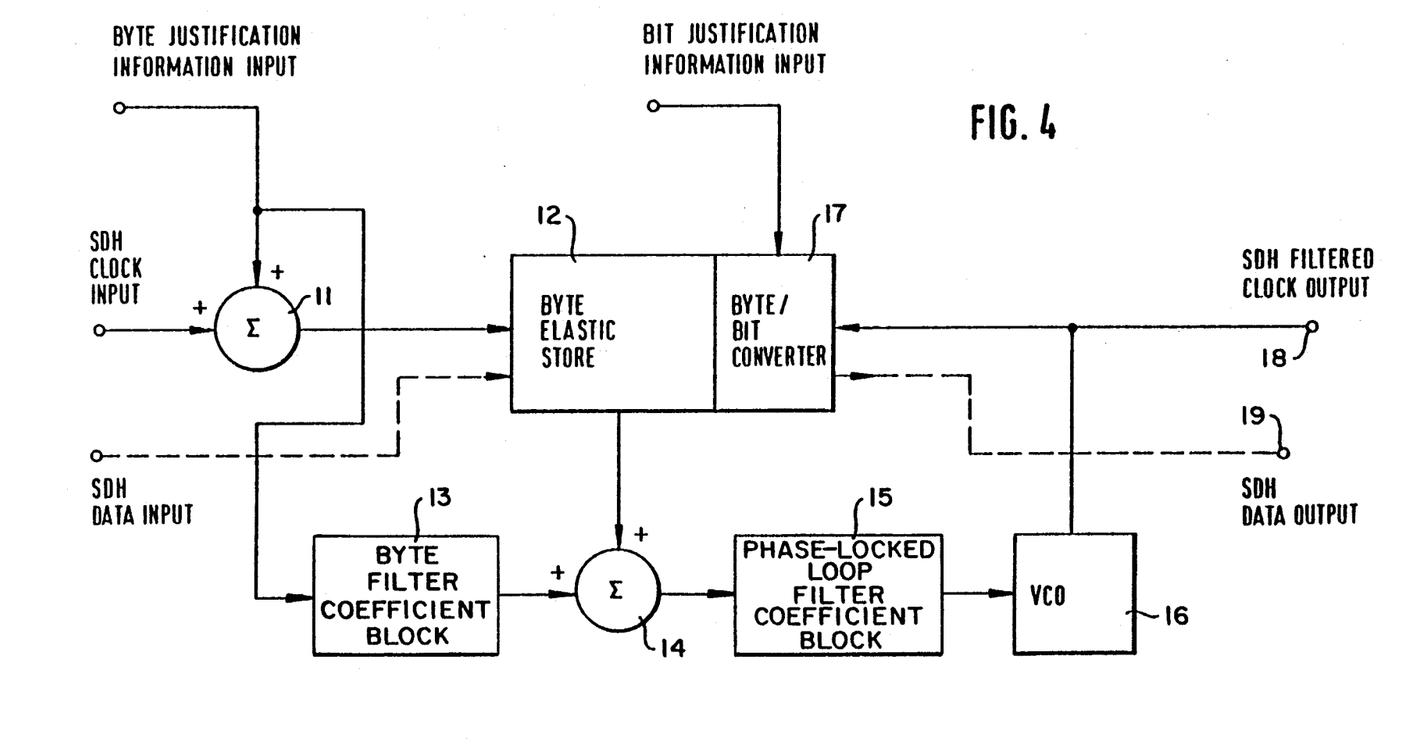
FIG. 4 shows a phase locked loop arrangement embodying the invention.

Referring to FIG. 4, byte justification information is combined with raw SDH clock signal in a summing device 11 and the result is used as the write clock for a byte elastic store 12. Thus justification bytes are blocked from entering the store. The byte justification information is also made available to a byte filter coefficient block 13 and a signal therefrom is combined with elastic store 12 fill status information in summing device 14. The elastic store fill status information is a measure of the difference in the rates at which data is read into and out of the store 12. Summing device 11, byte elastic store 12, first filter coefficient generator 13 and summing device 14 form a transversal filter whose output is coupled to a phase locked loop filter coefficient device 15. The output of filter coefficient device 15 provides control information to a controlled oscillator (cf. a VCO) 16 which provides a read clock for a byte/bit converter 17 and the byte elastic store 12, thereby unloading the data for presentation at SDH data output 19. The read clock for the elastic store may be produced by a signal from the byte/bit converter indicating that the converter is ready to receive the next byte. Bit justification information is fed to converter 17 and reflects in the byte store 12 fill status which is applied to the phase locked loop elements comprising summing device 14, second coefficient generator 15 and oscillator 16. Bit justification information can vary size of bytes, e.g. $8+/-1$, and by speeding/slowing read clock for byte elastic store 12 to change the rate at which data is read from 12 into Byte/bit converter 17.

The filter formed by the first summing device 11, byte elastic store 12, first coefficient generator 13 and second summing device 14 has a bandpass characteristic like that used for bandpass filtering device 13 of FIG. 1. Similarly, the filter formed by the byte elastic store 12, second summing device 4, second coefficient generator 15, VCO 16 and converter 17 have filter characteristics like those of the second bandpass filtering device 17 of FIG. 1.

It will be understood that the order of summing the independent justification sources may be of any order. For example, the justification shown in converter 17 could be injected prior to summing device 11.

The techniques described in relation to the arrangement of FIG. 4 can be adapted to other arrangements which provide filtering for any number of independent sources of information such as, for example, monitoring sources providing a plurality of independent factors in any process.

Regarding the filtering responses, any filter response which uses the separate filtering component arrangement described in relation to FIG. 1 is also possible with the combination filter arrangement described in relation to FIG. 4.

While the present invention has been described with regard to many particulars it is to be understood that equivalents may be readily substituted without departing from the scope of the invention.

What is claimed is:

1. A method of extracting an output clock signal from an input data stream including specific data and two or more clock adjusting signals having independent rates of adjustment, the method comprising the steps of:
   identifying clock adjusting signals, including at least a first clock adjusting signal having a first clock adjusting rate, and a second clock adjusting signal having a second clock adjusting rate,
   writing the input data stream to retiming means (105) at a write rate,
   reading an output data stream from the retiming means (105) at a read rate, generating an output clock signal to control the read rate, comparing the read rate with the write rate, and responsive thereto adjusting the output clock signal so that the read rate substantially equals the write rate at a rate of adjustment determined by the first and second clock adjusting signals.

2. A method as claimed in claim 1, wherein upon identifying the first clock adjusting signal corresponding data containing stuff information is blocked from entering the retiming means (105).

3. A method as claimed in claim 2, wherein the retiming means comprises a buffer store feeding into a parallel-to-serial converter.

4. A method as claimed in claim 1, wherein upon identifying the first clock adjusting signal corresponding data is not fed out of the retiming means (105).

5. A method as claimed in claim 4, wherein the retiming means comprises a buffer store feeding into a parallel-to-serial converter.

6. An method as claimed in claim 1, wherein the retiming means (105) comprises a buffer store for feeding the data stream into a parallel-to-serial converter (113).

7. A method as claimed in claim 6, wherein the step of comparing the read rate with the write rate includes measuring the contents of retiming means (105).

8. A method as claimed in claim 7, wherein the input data stream includes justification bytes, justification bits, justification byte identification information, and justification bit identification information, wherein data is fed from the buffer store to the parallel-to-serial converter means in variable length bytes, and wherein the justification bit identification information is used to control the length of said variable length bytes.

9. A method as claimed in claim 6 wherein the input data stream includes justification bytes, justification bits, justification byte identification information, and justification bit identification information, wherein data is fed from the buffer store to the parallel-to-serial converter means in variable length bytes, and wherein the justification bit identification information is used to control the length of said variable length bytes.

10. A method as claimed in claim 6, wherein the method further includes the step of using the output clock signal as a read clock to read the data out of a parallel-to-serial converter (113).

11. A method of extracting output data from a stream of pulses containing data bytes, justification bytes and justification bits, justification bit identification information and justification byte identification information, the method comprising:

receiving the stream of pulses, using the justification byte information to write the data bytes into a buffer store means of a retiming means, measuring the contents of the buffer store means to produce a store fill status signal, controlling a frequency of an output clock signal depending on the value of the store fill status signal, operating the buffer store means as a FIFO store, feeding the data from the buffer store means to a parallel-to-serial converter in bytes at a rate controlled by the output clock signal, controlling the number of bits per byte by the bit justification information, and controlling said frequency of the output clock signal by the store fill status signal to maintain the contents of the buffer store means at a chosen level.

12. An output clock filter apparatus for obtaining a smoothed output clock from a data stream including specific data and two or more clock adjusting signals having independent rates of adjustment, comprising:

identification means (102, 110) to detect clock adjusting signals, including at least a first clock adjusting signal having a first clock adjusting rate, and a second clock adjusting signal having a second clock adjusting rate, means (103, 104) responsive to the data stream, for detecting a specific data clock rate and for adjusting said rate with the first clock adjusting signal to produce a write clock signal determining a write rate, retiming means (105) into which the data stream is stored, having retiming content measuring means (105a) to compare the write rate at which the data stream is fed into the retiming means (105) with a read rate at which the data stream is read out of the retiming means (105) and to provide a store fill status signal, and output clock generating means (108, 109) including a controllable oscillator (109) controlled by oscillator control means (108), responsive to the store fill status signal, for providing the smoothed output clock, the oscillator controller (108) adjusting the frequency of the oscillator (109) at a rate of adjustment determined by the first and second clock adjusting signals so that the read rate substantially equals the write rate.

13. An apparatus as claimed in claim 9, wherein the apparatus includes a first gating means (104) for identifying the first clock adjusting signal to prevent data associated with the first clock adjusting signal from entering the retiming means (105).

14. Apparatus for extracting smoothed output data from a data stream including specific data and two or more sources of clock adjusting signals, the apparatus including an output clock filter arrangement as claimed in claim 13 wherein the output of the controllable oscillator (109) is used as the read clock to control the output of the parallel-to-serial converter.

15. An apparatus as claimed in claim 9 wherein the retiming means (105) comprises a buffer store feeding the data stream into a parallel-to-serial converter (113).

16. An as claimed in claim 15, wherein the comparison means comprises means (105a) to measure the level of the contents of the buffer store.

17. An apparatus as claimed in claim 15, wherein the data stream includes justification bytes, justification bits, justification byte identification information and justification bit identification information, the apparatus further includes byte control means to control the number of bits per byte fed from the buffer store to the parallel-to-serial converter in response to the justification bit identification information.

18. A method for adjusting a local clock data rate to accommodate a data rate of an incoming data stream which includes byte justification information and bit justification information, the method comprising:

combining the byte justification information with incoming data byte clock information to produce a first control clock signal, storing the incoming data stream in an elastic store under the control of the first control clock signal, deriving a store fill status output from a level of the contents of the elastic store, generating a first coefficient representative to the rate of byte justification in relation to the data byte rate, combining the first coefficient with the store fill status output to provide an input to a local clock control circuit, and controlling the frequency of the local clock thereby, combining the output of the local clock with the bit justification information to produce a second control clock signal, transferring the contents of the elastic store to a byte/bit converter under the control of the second control clock signal, and controlling the output of the byte/bit converter to output the data at the frequency of the local clock.

19. An arrangement for readjusting a local data rate to accommodate a data rate of an incoming data stream which includes byte justification information and bit justification information, the arrangement comprising:

first adder means for adding the byte justification information to incoming data byte clock information, an output of the first adder means being applied to byte elastic store means as a byte input clock signal, the data from the incoming data stream being fed into the elastic store means under the control of the byte input clock signal, said byte elastic store including a store fill status output indicating a level of the contents of the elastic store means, the byte justification information being applied to a first coefficient generator which produces an output corresponding to the number of insertions of justification bytes in relation to the data byte rate, first combining means to combine the output of the first coefficient generator and the store full status output, an output of the first combining means being applied to a second coefficient generator which controls the frequency of a local clock oscillator to bring the local clock oscillator closer to synchronism with a bit clock rate of the incoming data, second combining means for combining the output of the local clock oscillator means with the bit justification information for controlling the reading of the data from the elastic store means into a byte/bit converter, the data being read from the byte/bit converter under the control of the output of the local clock oscillator.

20. A method of extracting a smoothed output clock from an input data stream having a first clock rate, the data stream including specific data and two or more independent clock adjusting signals in the form of stuffed data, the independent clock adjusting signals having independent rates of adjustment, the data stream including, for each of the clock adjusting signals, stuffing control signals (C1, C2, H1, H2) indicative of the presence or absence of stuffed data, the method comprising the steps of:

receiving the input data stream;

identifying the clock adjusting signals from the stuffing control signals, the identified clock adjusting signals including at least a first clock adjusting signals having a first clock adjusting rate and a second clock adjusting signal having a second clock adjusting rate;

generating a write clock by removing the first clock adjusting signal from the input data stream;

applying the data stream to retiming means and preventing the stuffed data and stuffing control signals of the first clock adjusting signal from entering the retiming means determined by the first clock adjusting signal, the retiming means including controllable storage means into which the data stream without the stuffed data and stuffing control signals of the first clock adjusting signal is written under the control of the write clock, the retiming means including a parallel-to-serial converter to which the output of the storage means is applied;

generating a read clock to control the rate of reading of bytes of data from the storage means to the converter substantially at a rate at which data is read out of the converter;

applying the second clock adjusting signal to control the number of bits per byte transferred from the storage means to the converter;

measuring the level of the contents of the storage means against a predetermined fill level to obtain an unfiltered first control signal (107) indicative of the rate of the read clock in comparison with the rate of the write clock;

combining the unfiltered first control signal (107) with the first clock adjusting signal (117) to produce a second control signal (108a) to control the rate of the adjustment of the read clock (112); and combining the second control signal (108a) with the second clock adjusting signal (110a) to adjust the rate of the read clock (112).

21. A method as claimed in claim 20, wherein the method further comprises the steps of filtering the first clock adjusting signal (117) in a high pass filtering process including the steps in claim 21; and subtracting the first clock adjusting signal (117) from the unfiltered first control signal (107) to obtain the second control signal (108a), the second control signal (108a) comprising a first component being the result of a first low pass filter operation having first filter characteristics on the first clock adjusting signal (117) resulting from a transversal filter action of the combination of the unfiltered first control signal (107) and the first clock adjusting signal (117), and a second component being an unfiltered signal representing the second clock adjusting signal (112).

22. A method as claimed in claim 21 wherein the method includes the step of:

filtering the second control signal (108a) in a second low pass filter operation having second filter characteristics before applying the second control signal (108a) to control the rate of adjustment of the read clock, whereby the rate of adjustment of the read clock is controlled by first and second filter characteristics.

23. An output clock filter arrangement for obtaining a smoothed output clock from a data stream having a first clock rate, the date stream including specific data and two or more independent clock adjusting signals in the form of stuffed data, the independent clock adjusting signals having independent rates of adjustment, the data stream including, for each of the clock adjusting signals, stuffing control signals (C1, C2, H1, H2) indicative of the presence or absence of stuffed data, the arrangement including:

at least first and second clock adjusting signal detection means to detect respective first and second clock adjusting signals having respective first and second clock adjusting rates;

first combining means for filtering the first clock adjusting signals from the data stream to produce a write clock;

retiming means including first storage means into which the data stream is fed under the control of the write clock whereby the stuffed data of the first clock adjusting signal is prevented from entering the storage means;

the retiming means including a parallel to serial converter into which the output of the storage means is fed under the control of a byte signal;

a controllable read clock generator controlling the rate of the byte signal, and the rate at which data is read out of the converter;

byte signal control means to control the number of data bits per byte fed from the storage means to the converter in response to the second clock adjusting signal;

contents level means associated with the storage means to measure the level of the contents in relation to a predetermined fill level to obtain a first control signal (107) indicative of an average rate of the read clock in comparison with an average rate of the write clock;

second combining means in which the first control signal is combined with the first clock adjusting signal to produce a second control signal to adjust the rate read clock.

24. An arrangement as claimed in claim 23, wherein the arrangement includes a high pass filter between the output of the first clock adjusting signal detection means and the second combining means; the read clock generator comprises a controlled oscillator, and the second control signal is applied to the oscillator via an oscillator control circuit.

* * * * *

UNITED STATES PATENT AND TRADEMARK OFFICE
CERTIFICATE OF CORRECTION

PATENT NO. : 5,255,293
DATED : October 19, 1993
INVENTOR(S) : Archer et al.

It is certified that error appears in the above-identified patent and that said Letters Patent is hereby corrected as shown below:

At column 10, line 34, please change "9" to --12--.

At column 10, line 47, please change "9" to --12--.

Signed and Sealed this

Thirty-first Day of May, 1994

Attest:

BRUCE LEHMAN

*Attesting Officer*          *Commissioner of Patents and Trademarks*